United States Patent [19]

Bahner et al.

[11] 4,312,136

[45] Jan. 26, 1982

[54] ARRANGEMENT AND METHOD OF DRYING ARTICLES

[75] Inventors: Friedrich Bahner, Rotenburg; Kurt Eberhardt, Bad Hersfeld; Ernst Lotz, Haunetal 1-OT Neukirchen, all of Fed. Rep. of Germany

[73] Assignee: Buettner-Schilde-Haas AG, Krefeld, Fed. Rep. of Germany

[21] Appl. No.: 782,542

[22] Filed: Mar. 29, 1977

[30] Foreign Application Priority Data

Mar. 30, 1976 [DE] Fed. Rep. of Germany ....... 2613512

[51] Int. Cl.³ .............................................. F26B 3/00
[52] U.S. Cl. .......................................... 34/35; 34/86; 34/212; 34/216
[58] Field of Search ..................... 34/35, 212, 224, 77, 34/38, 78, 209, 28, 48, 210, 215, 216, 217, 86

[56] References Cited

U.S. PATENT DOCUMENTS

| | | | |
|---|---|---|---|
| 2,775,823 | 1/1957 | Crener et al. | 34/35 |
| 3,991,482 | 11/1976 | Broch et al. | 34/212 |
| 4,050,885 | 9/1977 | Nowick et al. | 34/212 |
| 4,231,165 | 11/1980 | Gresens et al. | 34/212 |

*Primary Examiner*—J. L. Barr
*Attorney, Agent, or Firm*—Michael J. Striker

[57] ABSTRACT

Wet plasterboard to be dried is advanced along a path. At an upstream portion of the path, air is heated and directed towards the plasterboard for initial drying of the latter. A portion of the heated air is withdrawn and passed through one section of a heat exchanger whose other section contains water which exchanges heat with the heated air. The heated water is passed through a section of another heat exchanger whose other section contains fresh air which is heated by the heated water. The heated fresh air is directed towards the articles for further drying of the latter at a downstream portion of the path. A portion of the heated fresh air is exhausted and recirculated at the downstream path portion.

12 Claims, 1 Drawing Figure

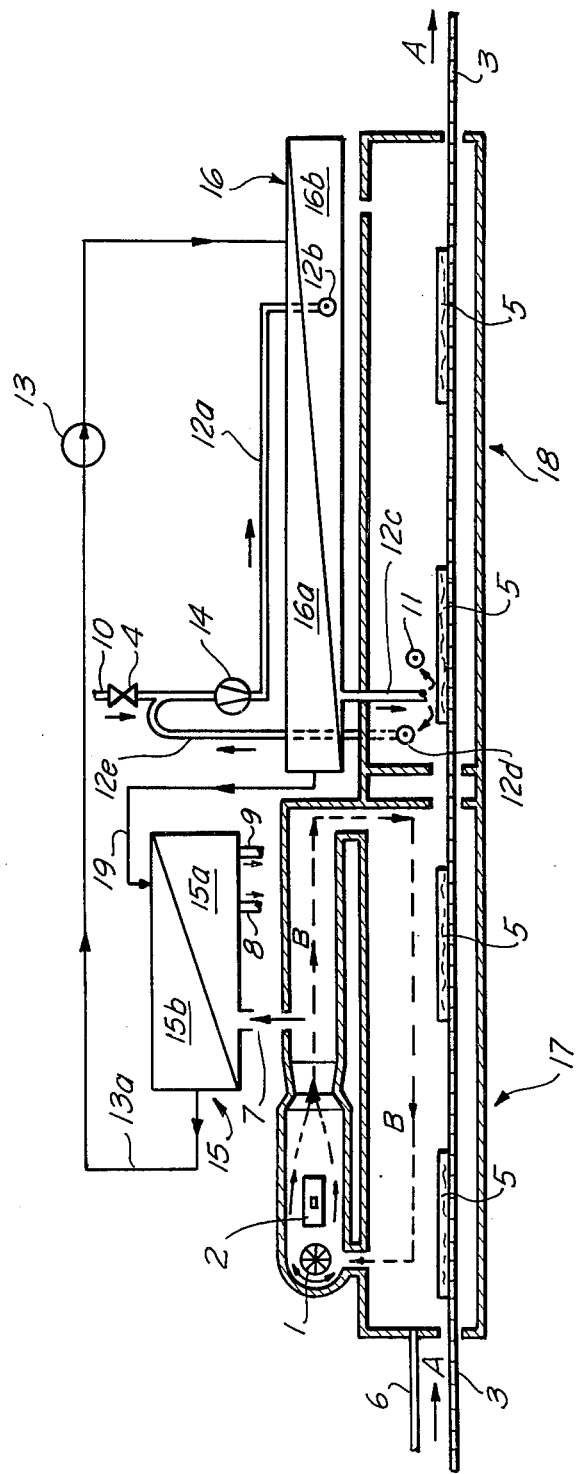

ARRANGEMENT AND METHOD OF DRYING ARTICLES

BACKGROUND OF THE INVENTION

The present invention generally relates to a method and an arrangement for drying articles and, more particularly, to a method and arrangement for drying wet plasterboard material.

It has been proposed to reclaim heat in multistage drying arrangements. Heated air is withdrawn from a main drying station and directed to one section of a heat exchanger. Fresh air is passed through the other section of the heat exchanger, and the fresh air is thereby heated by the heated air in said one section. Since large quantities of fresh air are utilized, the withdrawn air is rapidly cooled down and a considerable amount of condensation is formed. Moreover, the heated fresh air is at a lower temperature than the heated air in the main drying station and is also directed towards the articles for drying of the latter at an auxiliary drying station.

The prior art has proposed using the auxiliary drying station as a pre-dryer, and the main drying station as a subsequent dryer. Although this arrangement is satisfactory for drying foodstuffs, it is not satisfactory for drying wet plasterboard articles.

SUMMARY OF THE INVENTION

Accordingly, it is a general object of the present invention to provide a satisfactory arrangement for drying wet plasterboard articles.

It is a further object of the present invention to provide a simple and reliable arrangement for drying wet plasterboard which is highly efficient in operation.

In keeping with these objects and others which will become apparent hereinafter, one feature of the invention resides, briefly stated, in an arrangement for and method of drying articles, particularly plasterboard, which are advanced along a path. A first drying medium, e.g. air, is heated at an upstream portion of the path and is directed towards the articles for initial drying of the latter at said upstream path portion. A portion of the heated air is withdrawn from said upstream path portion and is passed through one section of a first heat exchanger. A heat exchange medium, e.g. water, is passed through another section of the first heat exchanger wherein heat exchange is effected between the withdrawn portion of air and the water. The heated water is passed through a section of another heat exchanger whose other section contains a second drying medium, e.g. fresh air. Heat exchange is effected between the heated water and the fresh air, and the thereby heated fresh air is directed towards the articles for further drying of the latter at a downstream portion of the path. A portion of the heated fresh air is exhausted from the downstream path portion and, advantageously, may be recirculated through the other heat exchanger.

In accordance with the invention, the plasterboard articles are reliably dried in their passage through upstream and downstream drying stations. The upstream drying station is thus maintained at relatively high temperatures and high humidity levels, whereas the downstream drying station is maintained at relatively lower temperature and humidity levels. The drying efficiency of the upstream station is on the order of two times and even three times as large as the drying efficiency at the downstream station.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

The single FIGURE is a diagrammatic view, partially in section, of the method and arrangement in accordance with the present invention.

DESCRIPTION OF THE PREFERRED EMBODIMENTS

The single FIGURE shows a method and arrangement for drying wet articles. The articles 5 are mounted on a conveyor 3 which is operative for advancing the articles 5 to be dried along a path in direction of arrows A through upstream drying station 17 and downstream drying station 18.

A first drying medium, e.g. air, is admitted into upstream station 17 via inlet conduit 6. A portion of this air is withdrawn by blower 1 and heated by burner 2. The blower 1 is operative for directing the air in direction of arrows B around the burner 2 and in countercurrent direction to the advancing articles 5. The articles 5 are thus initially dried in station 17, and the ambient air in station 17 becomes charged with moisture evaporated from the articles 5.

A portion of the heated air in station 17 is withdrawn and passes through section 15a of heat exchanger 15 towards outlet conduit 8. Conduit 9 is used for discharging any condensate collected in section 15a.

A heat-exchange medium, e.g. water, is circulated in a closed path by pump 13. The water passes through the other section 15b of heat exchanger 15 and is heated by heat exchange with the heated air in section 15a. The heated water passes through conduit 13a to section 16a of another heat exchanger 16. Conduit 19 conveys the water from section 16a back to section 15b, thereby completing the closed path for the water.

A second drying medium, e.g. fresh air, is admitted into inlet conduit 10. Blower 14 is operative for passing the fresh air past flow-regulating valve 4 and through conduit 12a which has an outlet port 12b which communicates with the other section 16b of heat exchanger 16. Heat exchange is effected between the heated water in section 16a and the fresh air in section 16b for heating the latter. The heated fresh air is discharged through conduit or nozzle 12c which directs the air towards the articles 5 for further drying of the latter at downstream station 18. The ambient air in station 18 becomes charged with remaining moisture not already evaporated from articles 5.

A portion 7 of the heated air in station 18 is exhausted from station 18 through opening 12d formed at the lower end of conduit 12e. The upper curved end of conduit 12e is connected to conduit 12a in the region between valve 4 and blower 14 for recirculating the exhausted air back through section 16b of heat exchanger 16.

A main exhaust 11 having a valve regulator communicates with the ambient atmosphere at the exterior of the downstream station 18 and is operative for discharging a controlled amount of air from station 18, as required.

A plurality of heat exchangers similar to heat exchanger 16 are located behind heat exchanger 16 as considered into the plane of the FIGURE. Each heat exchanger has its own blower 14, fresh air conduit 10, nozzle 12c and return conduit 12e. The nozzles 12c are thus arranged transversely of the direction of advancement of articles 5, and thereby serve to dry the articles 5 in station 18 in direction transversely of the path. Of course, a single elongated nozzle extending transversely of the path could also be used. Another possibility is that the opening of conduit 12c is located at one lateral side of the advancing articles 5, and that opening 12d of conduit 12e is located at the other lateral side of the advancing articles 5. In this latter case, a cross-flow of drying air is established across the path.

The disclosed method and arrangement is particularly well adapted for drying wet plasterboard, i.e. an article comprised of a gypsum plaster core sandwiched and bonded between two layers of tough paper.

It is advantageous if the ambient drying medium in upstream station 17 has an air temperature in excess of 200° C. and an absolute humidity or moisture content in excess of 0.8 kg of moisture per kilogram of air. It is further advantageous in this latter case if the ambient drying medium in downstream station 18 has an air temperature on the order of 90° C. and an absolute humidity under 0.05 kg of moisture per kg of air.

The utilization of the available heat in the ambient drying mediums at both upstream and downstream stations is optimized if the volumetric rates of the various flows are controlled relative to each other. Thus, it is desirable if the air circulating through conduits 12c and 12e is advanced by blower 14 at a volumetric flow rate approximately 50 to 100 times greater than the volumetric flow rate at which the air in station 17 is withdrawn towards heat exchanger 15. It is further desirable if the valve 4 admits fresh air through conduit 10 at a volumetric flow rate on the order of one-tenth of the air circulating through conduits 12a, 12c, 12e.

Due to the high moisture content of the air withdrawn from station 17 to heat exchanger 15, a relatively large part of the heat content of this withdrawn air can be reclaimed at relatively high temperatures. This reclaimed heat serves to further dry the articles at downstream station 18. This reclaimed heat is employed in heating large quantities of incoming fresh air, and thereupon bringing this heated fresh air into contact with the outer surface of the articles whereat a relatively large partial pressure drop occurs between the ambient air and the articles. In order not to overheat the articles, somewhat lower than normal operating temperatures may be used at downstream station 18. In this case, the drying speed is not affected in spite of the somewhat lower than normal temperatures when hygroscopic materials are utilized.

The method and arrangement of the invention is especially well suited for drying material having the properties of plasterboard. The combination of high humidity and high temperature in the upstream station do not adversely effect drying efficiency. The limitation of the temperature level in downstream station 18 to a maximum of approximately 95° C. is required in order to prevent calcination of the gypsum.

The air circulating in conduits 12a, 12c, 12e contains very little humidity. The air exhausted from exhaust 11 may be utilized without modification to provide heat for other purposes, e.g. for heating the facility at which the arrangement is located.

The condensate discharged from conduit 9 can also be recycled for various purposes. The amount of condensate collected may amount to approximately one-half of the air withdrawn from upstream station 17.

Another advantageous result obtained due to the relatively high humidity in upstream station 17 is that no conduit is required to conduct the withdrawn portion 7 from upstream station 17 to heat exchanger 15. During the heat exchange between sections 15a, 15b, a relatively large suction force is generated within section 15a because of the condensation of the vapor content of the withdrawn portion 7. Therefore, the withdrawn portion 7 will flow towards section 15a due to the generated vacuum effect.

The air flow in upstream station 17 may be directed in direction along the advancement of articles 5 or in transverse direction thereof. The air flow in downstream station 18 is generally in direction transverse to the advancing articles. Advantageously, the discharge ports of the nozzles at downstream station 18 are spaced at least 40 mm from the upper surface of the advancing articles and the exit speed of the drying medium being directed towards the articles is on the order of 16 meters per second.

It will be understood that each of the elements described above, or two or more together, may also find a useful application in other types of constructions differing from the types described above.

While the invention has been illustrated and described as embodied in an arrangement and method of drying articles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of drying articles, particularly plasterboard, comprising the steps of advancing articles to be dried along a path; heating a first drying medium to a first temperature at an upstream portion of the path; directing the heated first medium towards the articles in a direction countercurrent to the direction of the advancement said articles along said path, for initial drying of the latter at said upstream path portion, whereby the heated first medium becomes charged with a first moisture content; withdrawing a portion of the moisture-charged and heated first medium from said upstream path portion and advancing said withdrawn portion to a heat exchanger; effecting heat exchange between said withdrawn portion and a second drying medium, for heating the latter to a second temperature lower than said first temperature; and directing the heated second medium towards the articles at a downstream portion of the path in a direction transversely of the advancement said articles along said path for further drying of the articles so that the heated second medium becomes charged with a second moisture content less than said first moisture content.

2. The method of claim 1, wherein said withdrawing step includes withdrawing a predetermined volumetric quantity of said withdrawn portion; and further comprising the step of admitting the second medium into said downstream path portion at a volumetric quantity greater than said predetermined quantity.

3. The method of claim 1, wherein said step of directing the second medium is performed at a predetermined flow rate; and wherein said step of directing the first medium includes directing the latter at a flow rate greater than said predetermined flow rate such that the drying of the articles in said upstream path portion proceeds at least two times faster than in said downstream path portion.

4. The method of claim 1, wherein said step of heating the first drying medium includes heating air to a temperature of at least 200° C. and charging the heated drying air to a moisture content of at least 0.8 kg of moisture per kg of air, and wherein said step of effecting heat exchange includes heating air to a temperature on the order of 90° C. and charging the heated drying air to a moisture content of at most 0.05 kg of moisture per kg of air.

5. The method of claim 1, and further comprising the step of exhausting the less humid and lower temperature second medium from said downstream path portion, and the step of recirculating the exhausted second medium towards said downstream path portion.

6. The method of claim 5, wherein said withdrawing step is performed at a predetermined flow rate; and wherein said exhausting step includes exhausting the less humid and lower temperature second medium at a flow rate at least 50 times greater than said predetermined flow rate.

7. The method of claim 5, and further comprising the step of admitting said second medium into said downstream path portion at a predetermined flow rate, and wherein said exhausting step includes exhausting the less humid and lower temperature second medium at a flow rate 10 times greater than said predetermined flow rate.

8. The method of claim 1, wherein said step of directing the second medium includes conveying the latter towards the articles at a speed on the order of 16 meters per second.

9. A method of drying articles, particularly plasterboard, comprising the steps of advancing articles to be dried along a path; heating a first drying medium at an upstream portion of the path; directing the heated first drying medium towards the articles in a direction countercurrent to the direction of the advancement of said articles along said path, for initial drying of the latter at said upstream path portion; withdrawing a portion of the heated first drying medium from said upstream path portion; passing said withdrawn portion through one section of a first heat exchanger; passing a heat exchanging medium through another section of said first heat exchanger; effecting heat exchange between said withdrawn portion and said heat exchanging medium, passing said heated heat exchange medium through one section of a second heat exchanger; passing a second drying medium through another section of said second heat exchanger; effecting heat exchange between said heated heat exchanging medium and said second drying medium for heating the latter; directing the heated second drying medium towards the articles in a direction transversely of the advancement of said articles along said path, for further drying of the latter at a downstream portion of the path; exhausting a portion of said heated second drying medium from said downstream path portion; and recirculating said exhausted portion through said other section of said second heat exchanger.

10. In an arrangement for drying articles, particularly plasterboard, a combination comprising means for advancing articles to be dried along a path; means for heating a first drying medium at an upstream portion of the path; means for conveying the heated first drying medium towards the articles in a direction opposite to the advancement of said articles along said path, for initial drying of the latter at said upstream path portion; a first heat exchanger having two sections in heat exchanging relationship with each other; means for withdrawing a portion of said heated first drying medium from said upstream path portion; means for passing said withdrawn portion through one of said sections of said first heat exchanger; means for passing a heat exchange medium through the other of said sections of said first heat exchanger; means for effecting heat exchange between said withdrawn portion and said heat exchange medium; a second heat exchanger having two sections in heat-exchanging relationship with each other; means for passing said heat exchange medium through one of said sections of said second heat exchanger; means for passing a second drying medium through the other of said sections of said second heat exchanger; means for effecting heat exchange between said heated heat exchange medium and said second drying medium; means for directing the heated second drying medium towards the articles and transversely of the of the advancement of said articles along said path for further drying of the latter at a downstream portion of the path; means for exhausting a portion of said heated second drying medium from said downstream path portion; and means for recirculating said exhausted portion through said other section of said second heat exchanger.

11. The arrangement of claim 10, wherein said means for directing the heated second drying medium includes a nozzle.

12. The arrangement of claim 11, wherein said nozzle has a discharge port spaced from the articles by a distance of at least 40 mm.

* * * * *